No. 733,442. PATENTED JULY 14, 1903.
W. M. WADLEIGH.
HARVESTER ATTACHMENT FOR RAISING AND SAVING DOWN GRAIN.
APPLICATION FILED AUG. 11, 1902.
NO MODEL.
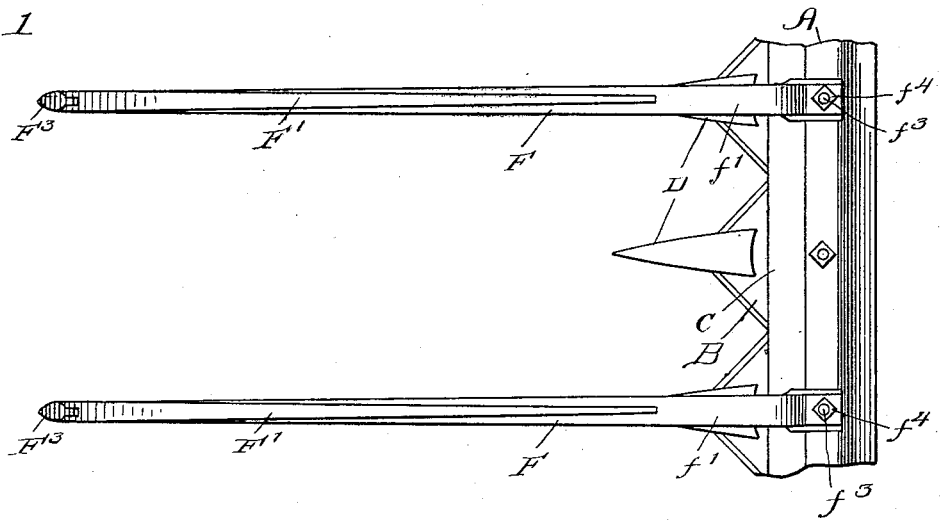
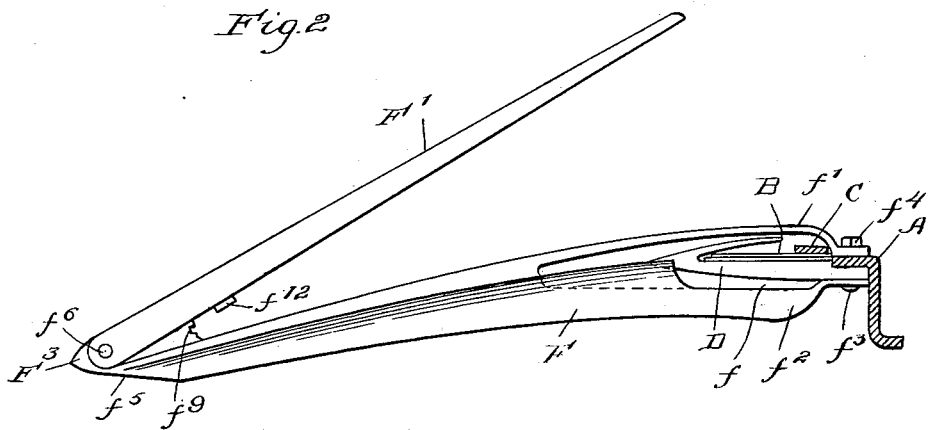
Witnesses
Wm. Geiger
A. W. Munday
Inventor:
William M Wadleigh
By Munday, Evarts & Adcock
Attorneys No. 733,442.

Patented July 14, 1903.

UNITED STATES PATENT OFFICE.

WILLIAM M. WADLEIGH, OF MILKS GROVE, ILLINOIS.

HARVESTER ATTACHMENT FOR RAISING AND SAVING DOWN GRAIN.

SPECIFICATION forming part of Letters Patent No. 733,442, dated July 14, 1903.

Application filed August 11, 1902. Serial No. 119,220. (No model.)

*To all whom it may concern:*

Be it known that I, WILLIAM M. WADLEIGH, a citizen of the United States, residing in Milks Grove, in the county of Iroquois and State of Illinois, have invented a new and useful Improvement in Harvester Attachments for Raising and Saving Down Grain, of which the following is a specification.

My invention relates to harvesters, reapers, and other machines for cutting grains, seed-grasses, and other crops.

The object of my invention is to provide an attachment or device of a strong, simple, efficient, and durable construction capable of being conveniently and quickly applied to or removed from the ordinary or customary constructions of harvesters and other machines now in use and by means of which such machines will be rendered capable of cutting and saving down, lodged, or crinkled grains or crops.

My invention consists in the novel construction of parts and devices and in the novel combinations of parts and devices herein shown or described, and particularly set forth in the claims.

In the accompanying drawings, forming a part of this specification, Figure 1 is a plan view of the device embodying my invention, showing, however, only a portion of the finger-bar of the ordinary harvester or other machine. Fig. 2 is a side elevation showing the finger-bar in cross-section. Fig. 3 is a central vertical longitudinal section through the upper or elevating arm of the elevating-guard. Fig. 4 is a cross-section on line 4 4 of Fig. 3.

In the drawings, A represents the finger-bar of an ordinary harvester or other machine; B, the sickle; C, the sickle-bar; D, the ordinary finger-guards, within which the sickle reciprocates, and F F' are the elevating-guards, the same being attached, preferably, to the finger-bar at each alternate finger-guard, although a greater or less number may be used. Each of the elevating-guards comprises a lower or supporting arm F and a pivoted and adjustable elevating-arm F'. The rigid unyielding lower or supporting arm F has a socket or recess $f$ to receive the finger-guard between its upper and lower integral forks or straps $f'$ $f^2$, the same being secured rigidly to the sickle-bar by a bolt $f^3$, having a threaded nut $f^4$. The supporting-arm F is preferably made of malleable iron and its upper strap or fork $f'$ sufficiently light, that it may be readily bent to properly fit the finger-guards of different styles of machines, so that the elevating-guard as a whole may be readily removed from and attached to any kind of machine. The lower or supporting arm F projects forwardly and downwardly from the finger-guard and is provided at its front end with an incline or taper $f^5$, giving the extreme front end of the supporting-arm a slant or runner shape to prevent the guard penetrating or projecting into the ground, while permitting it to ride directly upon the ground and under the down grain or crop which it is desired to cut and save. The upper or elevating arm F' of the elevating-guard is pivotally connected at its front end with the front end or nose of the lower or supporting arm F by a pivot $f^6$, and it is adjusted at any desired angle or elevation by means of a sliding spring lock-bolt $f^7$, which reciprocates in a suitable slot $f^8$ in the elevating-arm F' and which engages notches or recesses $f^9$ in the upright web F² of the lower or supporting arm F, with which said arm F is provided at its front portion. The front end of the elevating-arm F' has a slot $f^{10}$ to receive this upright web F². A spring $f^{11}$ holds the bolt in engagement with the notches. The lock-bolt $f^7$ has on its under side a projection $f^{12}$ to form a handle for retracting it.

While the nose or front end F³ of the finger-guard is broad and blunt in a vertical plane or dimension, it is comparatively narrow, thin, and pointed in respect to its horizontal dimension. This at once enables the nose of the guard to readily penetrate the grain, while at the same time it prevents the nose or point of the elevating-guard from entering the ground or piercing the cornstalks or other rubbish which would interfere with the operation. Both the upper and lower arms of the elevating-guard as a whole are preferably made of malleable iron.

I claim—

1. In a harvester or like machine, the combination with a finger-guard and finger-bar, of an elevating-guard having a rigid unyielding lower or supporting arm provided with a pair of forks or straps integral with said lower or supporting arm and embracing the finger-guard and secured to the finger-bar by a bolt passing through the finger-guard and both of said forks or straps and an elevating-arm extending at an angle to the supporting-arm and having a free upper end, substantially as specified.

2. In a harvester or like machine, the combination with a finger-guard and finger-bar, of an elevating-guard having a rigid unyielding lower or supporting arm provided with a pair of forks or straps integral with said lower or supporting arm and embracing the finger-guard and secured to the finger-bar by a bolt passing through the finger-guard and both of said forks or straps and an elevating-arm extending at an angle to the supporting-arm, said elevating-arm being pivoted to the supporting-arm and having a free upper end, substantially as specified.

3. In a harvester or like machine, the combination with a finger-guard and finger-bar, of an elevating-guard having a lower or supporting arm provided with a pair of forks or straps embracing the finger-guard and secured to the finger-bar by a bolt passing through the finger-guard and both of said forks or straps and an elevating-arm extending at an angle to the supporting-arm, said elevating-arm being pivoted to the supporting-arm and provided with a lock-bolt extending longitudinally of the elevating-arm and engaging notches on the supporting-arm to adjust the angle of the elevating-arm, substantially as specified.

4. In a harvester or like machine, the combination with a finger-guard of an elevating-guard having a lower or supporting member and an elevating-arm pivotally connected to the supporting-arm, the supporting-arm being provided with a series of notches, and the elevating-arm with a lock-bolt extending longitudinally of the elevating-arm, substantially as specified.

5. In a harvester or like machine, the combination with a finger-guard, of an elevating-guard having a lower or supporting member and an elevating-arm pivotally connected to the supporting-arm, the supporting-arm being provided with a series of notches, and the elevating-arm with a lock-bolt extending longitudinally of the elevating-arm, and a spring for holding the lock-bolt in engagement with the notches on the supporting-arm, substantially as specified.

6. In a harvester or like machine, the combination with a finger-guard, of an elevating-guard provided with a rigid, unyielding lower or supporting arm having an incline or runner shape at its front end, and furnished with a pair of forks or straps integral with said supporting-arm and embracing the finger-guard and secured to the finger-bar by a bolt passing through the finger-guard and both forks or straps of said supporting-arm, and an elevating-arm adjustably connected to the supporting-arm, substantially as specified.

7. In a harvester or like machine, the combination with a finger-bar and finger-guard, of an elevating-guard having a rigid, unyielding lower or supporting arm, and an elevating-arm adjustably secured thereto, said supporting-arm having a pair of forks or straps integral therewith and embracing the finger-guard and a bolt extending through both said forks or straps of the supporting-arm and the finger-guard and securing the same to the finger-bar, substantially as specified.

8. In a harvester or like machine, the combination with a finger-guard of an elevating-guard having a lower or supporting arm provided with an upright notched rib or web and an elevating-arm pivotally connected to the supporting-arm and having a slot to receive the notched rib or web on the supporting-arm, and a spring catch or bolt engaging the notched rib, substantially as specified.

WILLIAM M. WADLEIGH.

Witnesses:
H. M. MUNDAY,
L. LINDAUER.